US010840763B2

(12) United States Patent
Onishi et al.

(10) Patent No.: US 10,840,763 B2
(45) Date of Patent: Nov. 17, 2020

(54) EXPLOSION-PROOF DEVICE

(71) Applicant: MITSUBISHI HEAVY INDUSTRIES, LTD., Tokyo (JP)

(72) Inventors: Ken Onishi, Tokyo (JP); Koji Shukutani, Tokyo (JP); Hiroyoshi Okazaki, Tokyo (JP); Syuhei Kobori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 253 days.

(21) Appl. No.: 15/575,558

(22) PCT Filed: May 11, 2016

(86) PCT No.: PCT/JP2016/063943
§ 371 (c)(1),
(2) Date: Nov. 20, 2017

(87) PCT Pub. No.: WO2017/047159
PCT Pub. Date: Mar. 23, 2017

(65) Prior Publication Data
US 2018/0131177 A1    May 10, 2018

(30) Foreign Application Priority Data

Sep. 17, 2015    (JP) ................................ 2015-184281

(51) Int. Cl.
*H02K 5/136* (2006.01)
*H02K 5/00* (2006.01)
(Continued)

(52) U.S. Cl.
CPC .......... *H02K 5/136* (2013.01); *H01M 2/1016* (2013.01); *H01M 2/1077* (2013.01);
(Continued)

(58) Field of Classification Search
CPC .......... H02K 5/136; H02K 5/08; H02K 11/20; H02K 5/00; H02P 31/00; H01M 2/1077;
(Continued)

(56) References Cited

U.S. PATENT DOCUMENTS 4,896,357 A      1/1990  Hatano et al.
5,440,916 A  *   8/1995  Stone ................ B25J 5/005
                                                   73/23.31
(Continued)

FOREIGN PATENT DOCUMENTS

CN          203056624 A  *  7/2013
DE        102007063193 A1     1/2009
(Continued)

OTHER PUBLICATIONS

Hinouchi Toru; Matsumura Shigeru, Purging Timer, Sep. 6, 2012, Yokogawa Electric Corp, JP 2012167760 (English Machine Translation) (Year: 2012).*

(Continued)

*Primary Examiner* — Quyen P Leung
*Assistant Examiner* — Alexander A Singh
(74) *Attorney, Agent, or Firm* — Westerman, Hattori, Daniels & Adrian, LLP

(57) ABSTRACT

An explosion-proof device includes a frame having a hollow shape, the frame housing an electrical component and a battery capable of supplying the electrical component with electric power. A protection device is configured to stop electric supply to the electrical component from the battery, if there is a risk of an explosive atmosphere entering the frame. The battery is housed in an explosion-proof container, within the frame, and thus it is possible to suppress damage to surroundings effectively even in case of ignition of an explosive atmosphere flowing into the frame by the battery.

8 Claims, 3 Drawing Sheets

(51) Int. Cl.
- H02J 7/00 (2006.01)
- H01M 2/10 (2006.01)
- H02H 5/00 (2006.01)
- H02H 9/00 (2006.01)
- H02H 1/00 (2006.01)
- H02H 5/08 (2006.01)
- H02K 11/20 (2016.01)
- H01M 2/34 (2006.01)
- H01M 10/0525 (2010.01)
- H01M 10/42 (2006.01)
- H02P 31/00 (2006.01)
- H02H 7/18 (2006.01)

(52) U.S. Cl.
CPC ....... *H01M 2/345* (2013.01); *H01M 10/0525* (2013.01); *H01M 10/425* (2013.01); *H02H 1/0007* (2013.01); *H02H 5/00* (2013.01); *H02H 5/08* (2013.01); *H02H 9/008* (2013.01); *H02J 7/00* (2013.01); *H02J 7/0031* (2013.01); *H02K 11/20* (2016.01); *H02P 31/00* (2013.01); *H01M 2010/4271* (2013.01); *H01M 2200/20* (2013.01); *H01M 2220/20* (2013.01); *H02H 7/18* (2013.01)

(58) Field of Classification Search
CPC .............. H01M 2/345; H01M 10/425; H01M 10/0525; H01M 2010/4271; H01M 2200/20; H01M 2/1016; G01N 30/88; G01N 30/00; G01N 30/02; H02J 7/00; H02J 7/0031; H02H 5/00; H02H 5/08; H02H 9/008; H02H 1/0007; H02H 7/18
USPC .......................................................... 310/88
See application file for complete search history.

(56) References Cited

U.S. PATENT DOCUMENTS

| | | | |
|---|---|---|---|
| 2007/0105010 A1 | 5/2007 | Cassidy | |
| 2010/0159823 A1* | 6/2010 | Smith | H04B 7/155 455/7 |
| 2013/0249475 A1 | 9/2013 | Kang et al. | |
| 2014/0000299 A1* | 1/2014 | Maust | F25D 13/00 62/115 |

FOREIGN PATENT DOCUMENTS

| | | | | |
|---|---|---|---|---|
| JP | 63-028585 A | 2/1988 | | |
| JP | 2796482 B2 | 9/1998 | | |
| JP | 2001-355831 A | 12/2001 | | |
| JP | 2012-167760 A | 9/2012 | | |
| JP | 2012167760 A | * | 9/2012 | ............. G01N 30/88 |
| JP | 2015-36172 A | 2/2015 | | |
| JP | 2015-205386 A | 11/2015 | | |

OTHER PUBLICATIONS

Yu Dongbo; Zhang Peng; Guo Jingyi, Mining Flame-proof Heavy-current active equalization Lithium Ion Battery, Jul. 10, 2013, Beijing Control Technology, CN 203056624 (English Machine Translation) (Year: 2013).*

International Search Report dated Jul. 19, 2016, issued in counterpart International Application No. PCT/JP2016/063943 (10 pages).

International Preliminary Report on Patentability (Form PCT/IB/338) issued in counterpart International Application No. PCT/JP2016/063943 dated Mar. 29, 2018, with Form PCT/IB/373, PCT/ISA/237, and PCT/IB/326, with English translation (16 pages).

"Guidebook to Explosion-proof Safety (Guide to Maintenance of Explosion-proofed Electric Devices for Facility Safety Explosion-Protected Safety & Inspection of electrical Installations in Hazardous areas", Nippon Electric Control Equipment Industries association Explosion-proof Devices Committee; Cited in the specification (3 pages).

Office Action dated Jul. 2, 2019, issued in counterpart JP application No. 2015-184281, with English translation. (8 pages).

Extended (Supplementary) European Search Report dated Apr. 2, 2019, issued in counterpart EP application 16846032.7. (7 pages).

Office Action dated Jan. 15, 2020, issued in counterpart EP application No. 16846032.7. (7 pages).

Office Action dated Jul. 30, 2020, issued counterpart EP Application No. 16 846 032.7 (8 pages).

* cited by examiner

EXPLOSION-PROOF DEVICE

TECHNICAL FIELD

The present disclosure relates to an explosion-proof device to be used in an explosive atmosphere.

BACKGROUND ART

During disaster prevention support works and building maintenance works in an explosive atmosphere, an explosion-proof device equipped with explosion-proof measures may be used to ensure industrial safety. Such an explosion-proof device is provided with explosion-proof measures, so that electric sparks and high-temperature parts of electrical components to be used do not behave as a source of ignition for the explosive atmosphere.

Explosion-proof devices to be used in actual works are practically required to undergo a test by the type test organization. Such a test is conducted according to, for instance, the Globally Coherent Guide to Explosion-proof 2008Ex, which is an international standard, and the terms used in this specification also comply with the standard unless otherwise stated (as described below, should the standard be revised in future, the terms shall be interpreted according to the revised standard within the scope of shared technique idea). For the specific practice of the standard, one may refer to Non-patent Document 1, for instance.

As an example of such a type of explosion-proof device, Patent Documents 1 and 2 disclose an explosion-proof structure for an industrial robot that enters an explosive atmosphere and performs works. Patent Document 1 discloses an explosion-proof structure which supplies air into a frame of a robot via an air pipe from an external air supply source, and thereby maintains the pressure inside the frame to be higher than the pressure of a surrounding explosive atmosphere, for preventing the explosive gas from entering the frame, where electrical components are situated. This document particularly discloses providing a protection monitoring device which blocks power supply to the electrical components inside the frame, if there is a risk of the explosive gas entering the frame due to a pressure decrease inside the frame. Furthermore, Patent Document 2 discloses an explosion-proof structure provided with an air tank for supplying air into a frame, mounted on an outer side of the frame, which is configured to block power supply to the electrical components inside the frame in the event of a pressure decrease inside the frame, similarly to Patent Document 1.

CITATION LIST

Patent Literature

Patent Document 1: JP2796482B
Patent Document 2: JP2015-36172A

Non-Patent Literature

Non-Patent Document 1: Nippon Electric Control Equipment Industries Association Explosion-proof Devices Committee, Guidebook to Explosion-proof Safety (Guide to Maintenance of Explosion-proofed Electric Devices for Facility Safety)

SUMMARY

Problems to be Solved

Such a type of explosion-proof device may include a battery as a power source, housed inside the frame. In Patent Documents 1 and 2, as described above, explosion-proof measures are taken by blocking power supply to the electrical components when there is a risk of explosive gas entering the frame. However, a battery charged with electrical energy is still in the frame at an entry of the explosive gas, and may make contact with the explosive gas and behave as a source of ignition. Thus, if the battery causes the explosive gas to ignite, explosion of the battery may damage the surroundings.

At least one embodiment of the present invention was made in view of the above problem, and an object is to provide an explosion-proof device having an explosion-proof structure capable of effectively suppressing damage to the surroundings due to explosion of a battery, in case an explosive gas enters the frame.

Solution to the Problems (1) An explosion-proof device according to at least one embodiment of the present invention comprises: a frame having a hollow shape; an electrical component disposed in the frame; a battery being disposed inside the frame and being capable of supplying the electrical component with electric power; a protection device configured to stop electric supply to the electrical component from the battery, if a pressure inside the frame becomes not greater than a predetermined pressure value or if a pressure differential between inside and outside of the frame becomes not greater than a predetermined pressure differential value; and an explosion-proof container housing the battery, inside the frame.

With the above configuration (1), the battery disposed inside the frame for supplying electric power to the electrical components is housed in the explosion-proof container, and thereby it is possible to effectively suppress effects on the surroundings with the explosion-proof container, even in case of occurrence of explosion due to the battery behaving as the source of ignition at an entry of an explosive gas into the frame.

(2) In some embodiments, in the above configuration (1), the protection device includes a switching relay disposed in a power line between the battery and the electrical component, and configured to be capable of blocking electricity to the electrical component from the battery, and the explosion-proof container houses the switching relay, along with the battery.

With the above configuration (2), the switching relay, which may be a source of ignition for an explosive gas when being switched, is housed inside the explosion-proof container as described above, and thereby it is possible to effectively suppress effects on the surroundings even if an explosive atmosphere flows into the frame and explodes due to the switching relay.

(3) In some embodiments, in the above configuration (1) or (2), the battery includes a plurality of battery cells connected in series with one another, and the explosion-proof container houses a management device configured to manage the plurality of battery cells, along with the battery.

According to the above configuration (3), in a case where the management device is provided to manage a plurality of battery cells that constitute a battery, the management device is housed in the explosion-proof container alongside with the battery. Such a management device is supplied with some power on a constant basis to manage the state of the plurality of battery cells daily. Thus, when an explosive gas enters the frame, the management device is likely to behave as a source of ignition due to the continuous power supply to the management device, despite the protection device blocking the power supply from the battery to the electrical components. However, with the management device being housed in the explosion-proof container alongside with the battery, it is possible to reduce effects on the surroundings even in case the management device behaves as a source of ignition and causes explosion.

(4) In some embodiments, in any one of the above configurations (1) to (3), the explosion-proof container comprises a pressure-resistant explosion-proof container.

With the above configuration (4), the explosion-proof container for housing the battery comprises the pressure-resistant explosion-proof container, and thereby it is possible to realize an explosion-proof structure that withstands explosion of the battery or an internal explosive gas without being damaged, wherein all joints or structural openings of the container do not allow fire to reach the external explosive atmosphere.

(5) In some embodiments, in any one of the above configurations (1) to (4), the frame comprises an internal-pressure explosion-proof container.

With the above configuration (5), with the frame comprising the internal-pressure explosion-proof container, it is possible to isolate the electrical components and the battery, which may behave as a source of ignition, from an explosive atmosphere.

(6) In some embodiments, in any one of the above configurations (1) to (5), the explosion-proof container comprises a safety-enhanced explosion-proof container.

With the above configuration (6), the explosion-proof container housing the battery comprises the safety-enhanced explosion-proof container, and thereby it is possible to enhance the safety electrically, mechanically, or thermally, and thus to prevent breakdown such as insulation failure, contact failure, and disconnection, thereby effectively suppressing electrical ignition and abnormally high temperature which may become a source of ignition.

(7) In some embodiments, in any one of the above configurations (1) to (6), the explosion-proof device comprises a traveling body including a motor mounted thereto as a power source for traveling, the motor being capable of being driven by electric power supplied from the battery.

With the above configuration (7), the above described explosion-proof structure is applied to a traveling body that enters an explosive atmosphere and performs works. With such an explosion-proof structure, only the battery that may become a source of ignition in case of an entry of an explosive gas into the frame is housed in the explosion-proof container, and thus it is possible to avoid a considerable increase in the size and weight of the explosion-proof container. Accordingly, it is possible to effectively reduce the size and weight of the traveling body, and to achieve both of good explosion-proof performance and traveling performance.

(8) In some embodiments, in any one of the above configurations (1) to (6), the explosion-proof device comprises a control panel powered by the battery serving as a normal or emergency power source.

With the above configuration (8), it is possible to apply the above protection-proof structure to a control panel fixedly situated in an explosive atmosphere.

Advantageous Effects

According to at least one embodiment of the present invention, it is possible to provide the explosion-proof device having an explosion-proof structure capable of effectively suppressing damage to the surroundings due to explosion of the battery, in case an explosive atmosphere enters the frame.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
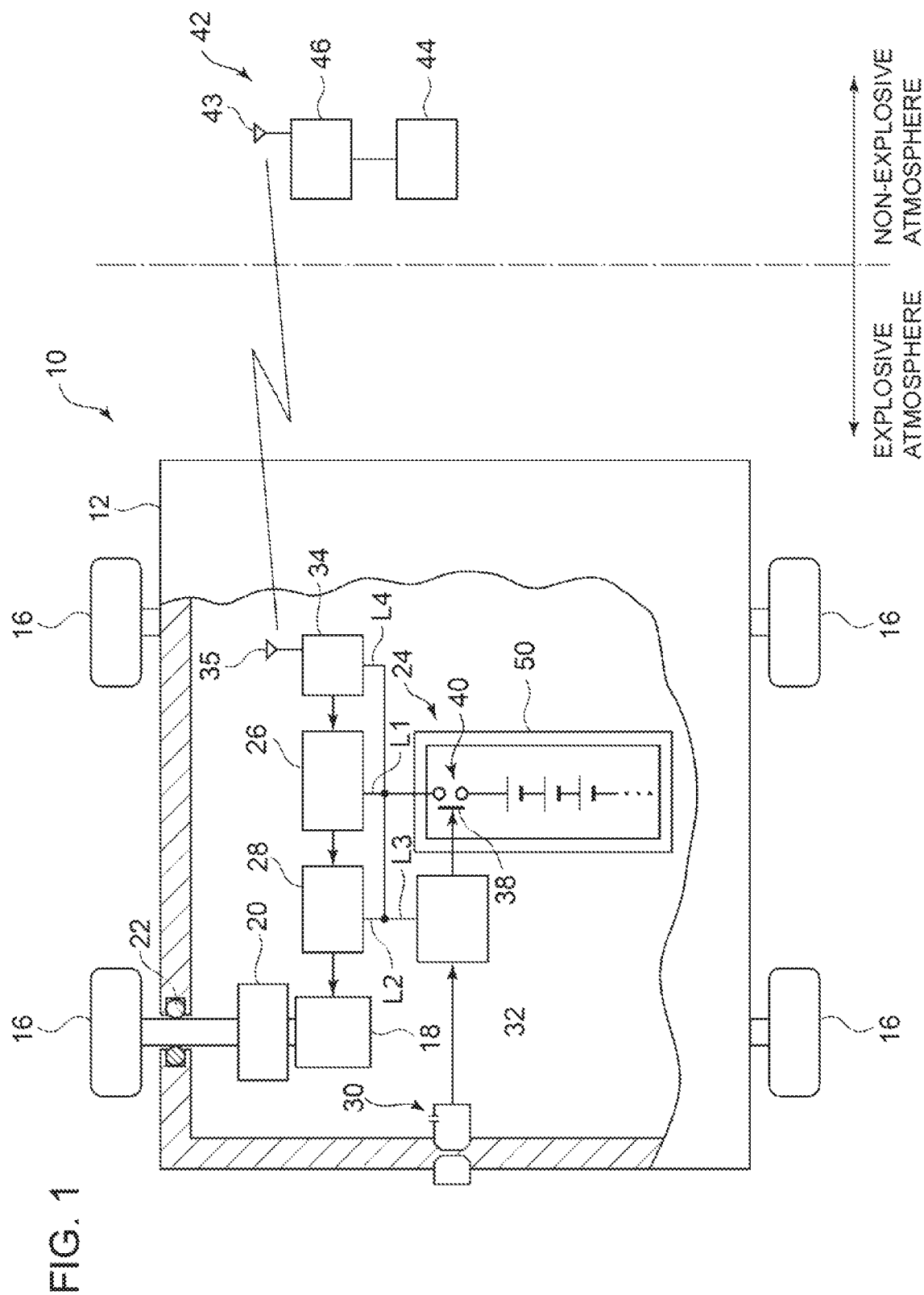
FIG. 1 is a schematic configuration diagram of an explosion-proof device according to at least one embodiment of the present invention.
Figure 2:
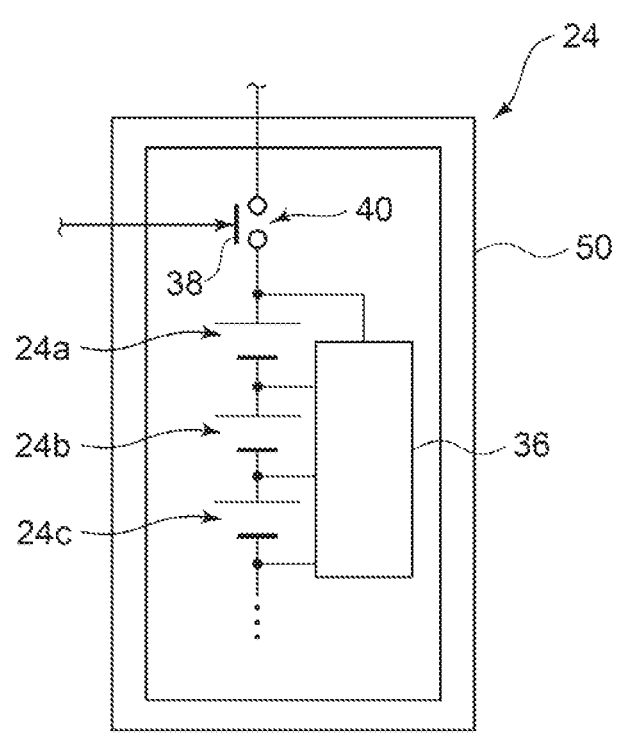
FIG. 2 is a modified example of the peripheral configuration of the battery shown in FIG. 1.

FIG. 1 is a schematic configuration diagram of an explosion-proof device 10 according to at least one embodiment of the present invention, and FIG. 2 is a modified example of the peripheral configuration of the battery 24 shown in FIG. 1.

The explosion-proof device 10 is an industrial robot capable of entering an explosive atmosphere by driving itself and performing or supporting various works such as disaster prevention support works and building maintenance works. Environments of such works include an extensive range of fields that may generate an explosive gas, such as oil and chemical plants, manufacture/storage/handling facilities for hazardous materials such as flammable liquids, painting facilities, work sites using solvents, high-pressure gas facilities, and fuel cell related facilities.

The explosion-proof device 10 is a traveling body including a frame 12 having a hollow shape and constituting a body, and being capable of traveling with four wheels 16 respectively disposed on the right-front, left-front, right-rear, and left-rear sections of the frame 12. A motor 18 is housed in the frame 12, for serving as a power source for traveling. A driving force from the motor 18 is transmitted to the wheels 16, so that the wheels 16 can travel on a field.

The explosion-proof device 10 includes a motor 18 capable of being driven by electric power supplied from a battery 24 described below, as a power source for traveling. The motor 18 has an output shaft connected to the wheels 16 via a speed reducer 20. The output of the motor 18 is transmitted to the wheels 16 via the speed reducer 20, and thereby traveling is realized.

It should be noted that, instead of the wheels 16, another traveling unit such as a crawler may be employed.

The frame 12 having a hollow shape houses electrical components including the above described motor 18. In the present embodiment, in particular, the frame 12 is configured as an internal-pressure explosion-proof device having an internal-pressure explosion-proof structure. In the internal-pressure explosion-proof structure, electrical components or parts that may behave as a source of ignition for an explosive gas are housed inside a container having a predetermined specification, and inert gas (protection gas) such as air and nitrogen is sent and pressurized into the container, thereby isolating the electrical components or the parts from an external explosive atmospheres.

The detailed specification of the internal-pressure explosion-proof structure complies with the Globally Coherent Guide to Explosion-proof 2008Ex (specifically, see the above Non-patent Document 1). Furthermore, should the guide be revised in future, the terms used in this specification shall also be interpreted according to the revised content.

The interior of the frame 12 is isolated from the exterior (explosive atmosphere), and thereby the frame 12 is maintained under an air-tight state. The frame 12 is filled with inert gas in advance, before the explosion-proof device 10 enters an explosive atmosphere.

While the frame 12 may have a small gap at, for instance, a part where a drive shaft connecting the wheel 16 and the reducer 20 is inserted through, in this embodiment, an air-tight state is ensured for such a gap with a seal member 22 disposed thereon.

Furthermore, inert gas inside the frame 12 is enclosed so that the pressure inside the frame 12 is higher than the pressure outside the frame 12. In the frame 12, such an internal-pressure explosion-proof structure prevents an explosive gas from entering the frame 12 from the surrounding explosive atmosphere.

The explosion-proof device 10 may include a gas supply device for filling the inside of the frame 12 with inert gas. For instance, the explosion-proof device 10 may be configured to be capable of supplying the frame 12 with gas via an air pipe from an air source provided independently outside the explosion-proof device 10, as disclosed in Patent Document 1, or supplying the inside of the frame 12 with gas from an air tank storing air in advance, the air tank being mounted to the explosion-proof device 10, as disclosed in Patent Document 2. Furthermore, the explosion-proof device 10 may include a discharge mechanism for discharging gas inside the frame 12, thus being capable of adjusting the internal pressure of the frame 12.

The frame 12 houses, as electrical components besides the above described motor 18, a battery 24 for supplying electric power, a controller 26 for performing various controls on the explosion-proof device 10, a driver 28 for driving the motor 18, a pressure detection part 30 capable of detecting at least one of the internal pressure or the external pressure of the frame 12, an explosion-proof logic circuit 32 for performing an explosion-proof control, and a receiver-transmitter 34 for receiving and transmitting various types of information with an external unit.

Although not shown in FIG. 1, the explosion-proof device 10 may include, in addition to the above described constituent elements, various devices corresponding to the content of work, such as a robot arm, a winch device, a lighting device, and an imaging device (camera), and the electrical components housed in the frame 12 may include various components for operating such a robot arm.

The battery 24 is an electric storage device for storing electric power to be supplied to the electrical components housed in the frame 12, and is connected to the controller 26, the driver 28, the explosion-proof logic circuit 32, and the receiver-transmitter 34, via power lines L1, L2, L3, and L4, respectively, so as to be capable of supplying electric power to the controller 26, the driver 28, the explosion-proof logic circuit 32, and the receiver-transmitter 34.

In the present embodiment, the battery 24 comprises a lithium-ion secondary battery having a relatively large energy density. The battery 24 comprises a plurality of secondary battery cells 24a, 24b, 24c, and so on, connected in series. As shown in FIG. 2, a management device (also known as battery management unit, or BMU) 36 may be provided to manage a variety of state parameters of the plurality of secondary battery cells 24a, 24b, 24c, ..., (e.g. charge amount, electric-current amount, temperature). The management device 36 monitors the state parameters of the respective secondary battery cells 24a, 24b, 24c, ..., and determines the state abnormality on the basis of the result of monitoring, then transmitting the determination result to the controller 26.

The management device 36 obtains electric driving power from the battery 24 to be managed. In other words, the power supply route to the management device 36 is provided independently from the above described power lines L1, L2, L3, and L4. Thus, even if the power lines L1, L2, L3, and L4 are blocked by the explosion-proof logic circuit 32 described below, the management device 36 can continue to receive power supply from the battery 24, and can continue management of the battery 24.

The controller 26 is a control unit for performing various controls of the explosion-proof device 10, and functions by obtaining electric power from the battery 24 via the power line L1. The controller 26 generates control signals for realizing various operations of the explosion-proof device 10 on the basis of a predetermined program stored in advance in a storage device (not shown) such as a memory, and sends commands to the constituent elements of the explosion-proof device 10 to perform controls.

The driver 24 is a driving unit for driving the motor 18, in response to the content of commands from the controller 26. For instance, the driver 24 adjusts the control electric current of the motor 18 so as to correspond to the control signals obtained from the controller 26, and thereby controls the driving state of the motor 18 and realizes traveling of the explosion-proof device 10.

The pressure detection part 30 detects at least one of the internal pressure or the external pressure of the frame 12. As described above, while the explosion-proof device 10 has an explosion-proof structure realized by setting the internal pressure of the frame 12 to be higher than the external pressure of the frame 12, the internal pressure of the frame 12 may decrease due to some reason, causing an explosive gas to enter. The pressure detection part 30 detects at least one of the internal pressure or the external pressure of the frame 12, and thereby performs pressure detection required to determine whether such an entry of an extensive gas could occur. For instance, the pressure detection part 30 may detect the differential pressure between the internal pressure and the external pressure of the frame 12, thereby detecting whether there is a risk of an explosive atmosphere entering the inside of the frame 12. In a case where an appropriate value is set in advance for the internal pressure of the frame 12, the pressure detection part 30 may detect only the internal pressure of the frame 12 to perform the determination (in the latter case, there is no need to detect the external pressure of the frame 12).

While the present embodiment described herein includes a pressure sensor as the pressure detection part 30, which handles detection results as electrical signals, a pressure switch may be employed instead, which mechanically performs switching according to a pressure value.

The explosion-proof logic circuit 32 performs an explosion-proof control on the basis of a detection result of the pressure detection part 30. Herein, a protection circuit 40 including a switching relay 38 capable of being turned on/off is disposed in the power lines for supplying electric power to the electrical components from the battery 24, and if it is determined that there is a risk of an explosive gas entering the frame 12 on the basis of the detection result of the pressure detection part 30 (i.e., if it is detected that the inside of the frame 12 has a lower pressure than the outside), the explosion-proof logic circuit 32 performs a switching control with the switching relay 38, thereby blocking power supply to the electrical components.

The switching relay 38 is a relay device that functions as an interlock breaker. Normally, the switching relay 38 is set to be in a closed state, as an initial state, so that electric power from the battery 24 is supplied to the electrical components. When the state of the switching relay 38 is switched to an open state by the explosion-proof logic circuit 32, electric supply to the electrical components can be blocked. When the protection circuit 40 is operated by the explosion-proof logic circuit 32, electric supply from the battery 24 stops, and thus it is possible to effectively prevent occurrence of explosion due to an electrical component behaving as a source of ignition, at an entry of explosive gas into the frame 12.

Moreover, a predetermined display may be shown to inform an operator when the protection circuit 40 is operated by the explosion-proof logic circuit 32.

The receiver-transmitter 34 is a communication device configured to be capable of performing wireless communication with a server 42 installed in a base station in a non-explosive atmosphere (outside an explosive atmosphere). The receiver-transmitter 34 includes an antenna 35 for receiving and transmitting radio waves for communication, disposed inside a radio-wave transparent air-tight dome, and performs wireless communication with an antenna 43 provided for the server 42. The server 42 includes an operation device 44 an operator can operate, and a receiver-transmitter 46 capable of receiving and transmitting command signals from the operation device 44 via the antenna 43. Accordingly, the explosion-proof device 10 can be operated remotely by an operator in a non-explosive atmosphere sending commands to the explosion-proof device 10.

While the communication between the explosion-proof device 10 and the server 42 is wireless in the present embodiment, wire communication using a communication optical fiber may be applied, for instance. Furthermore, for the explosion-proof device 10, wire connection with the outside via an alternative communication optical fiber may be provided alongside with wireless connection, in case of malfunction of the receiver-transmitter 34. In this case, it is possible to communicate with the outside via the communication optical fiber even if the receiver-transmitter 34 breaks down, while it is also possible to continue communication in case of disconnection of the communication optical fiber.

Herein, the battery 24 disposed inside the frame 12 is further housed in an explosion-proof container 50. In the present embodiment, in particular, the explosion-proof container 50 is configured as an pressure-resistant explosion-proof container having an pressure-resistant explosion-proof structure. The pressure-resistant explosion-proof structure is an explosion-proof structure comprising a container that withstands internal explosion due to an explosive gas having entered the container without being damaged, wherein all joints or structural openings of the container do not allow fire to reach the external explosive atmosphere.

According to the above described Non-Patent Document 1, such a pressure-resistant explosion-proof container is required to satisfy the following conditions. (i) The container has a strength that can withstand internal explosion sufficiently. The container is designed to have a strength that can withstand the explosive pressure in case explosion occurs inside the container. (ii) Flame having an ignition capacity does not escape through the joint surfaces forming the container. The joint surfaces of the container have "depth of gap" and "gap" such that high-temperature gas or flame is sufficiently cooled when being discharged outside through the gap in case of internal explosion, which prevents an external explosive gas from catching fire. (iii) The allowable temperature of the outer surface of the container, or the maximum surface temperature does not exceed a predetermined value. With regard to the ignition level and the temperature class specified in accordance with the ignition temperature of an explosive gas, the allowable temperature and the maximum surface temperature of the explosion-proof electric device are set so as not to exceed the specified value.

The detailed specification of the pressure-resistant explosion-proof structure complies with the Globally Coherent Guide to Explosion-proof 2008Ex and the like (see the above Non-patent Document 1 for details). Furthermore, should the guide be revised in future, the terms used in this specification shall also be interpreted according to the revised content.

Accordingly, the battery 24 disposed inside the frame 12 for supplying electric power to the electrical components is housed in the explosion-proof container 50, and thereby it is possible to effectively suppress effects on the surroundings with the explosion-proof container 50, even in case of occurrence of explosion due to the battery 24 behaving as the source of ignition at an entry of an explosive gas into the frame 12.

In the present embodiment, in particular, the explosion-proof container 50 houses the switching relay 38 forming the protection circuit 40 with the battery 24. The switching relay 38 may be a source of ignition for an explosive gas if a switching operation is performed while electric power is supplied. Thus, with the switching relay 38, which may be a source of ignition, housed inside the explosion-proof container 50 as described above, it is possible to effectively suppress effects on the surroundings even if the switching relay 38 ignites an explosive atmosphere in the frame 12 to cause explosion.

Furthermore, as shown in FIG. 2, the explosion-proof container 50 may house the management device 36 along with the battery 24. As described above, the management device 36 is supplied with power independently from the power lines for the other electrical components to manage the state of the battery 24 on a constant basis, and the management device 36 is continuously supplied with power even if the protection device 40 blocks electric supply to the electrical components. Accordingly, if an explosive gas enters the frame 12 during operation of the protection device 40, the management device 36 receiving continuous electric supply may become a source of ignition. Thus, with the management device 36 housed inside the explosion-proof container 50 with the battery 24 as described above, it is possible to effectively suppress effects on the surroundings even if the management device 36 becomes a source of ignition for an explosive atmosphere that has entered the frame 12.

With such an explosion-proof structure, only the constituent elements (battery 24 and management device 36) that may become a source of ignition in case of an entry of an explosive gas into the frame 12 are housed in the explosion-proof container 50, and thus it is possible to avoid a considerable increase in the size and weight of the explosion-proof container 50. Accordingly, it is possible to effectively reduce the size and weight of the explosion-proof device 10, and to achieve both of good explosion-proof performance and traveling performance as a traveling body.

Furthermore, the explosion-proof container 50 comprises a pressure-resistant explosion-proof container in the above embodiment, for the battery 24 comprises a lithium-ion secondary battery having a high energy density. Nevertheless, another type of explosion-proof container 50 may be employed corresponding to the specification of the battery 24 to be housed. For instance, if the battery 24 does not include a source of ignition other than a fuel cell, like the above management device 36, the explosion-proof container 50 may comprise a safety-enhanced explosion-proof container. Normally, a safety-enhanced explosion-proof container has a smaller size and weight than the above described pressure-resistant explosion-proof container, and thus it is possible to reduce the size and weight of the explosion-proof device 10 by suitably selecting a safety-enhanced explosion-proof container in accordance with the specification of the battery 24, and to improve the traveling performance.

Figure 3:
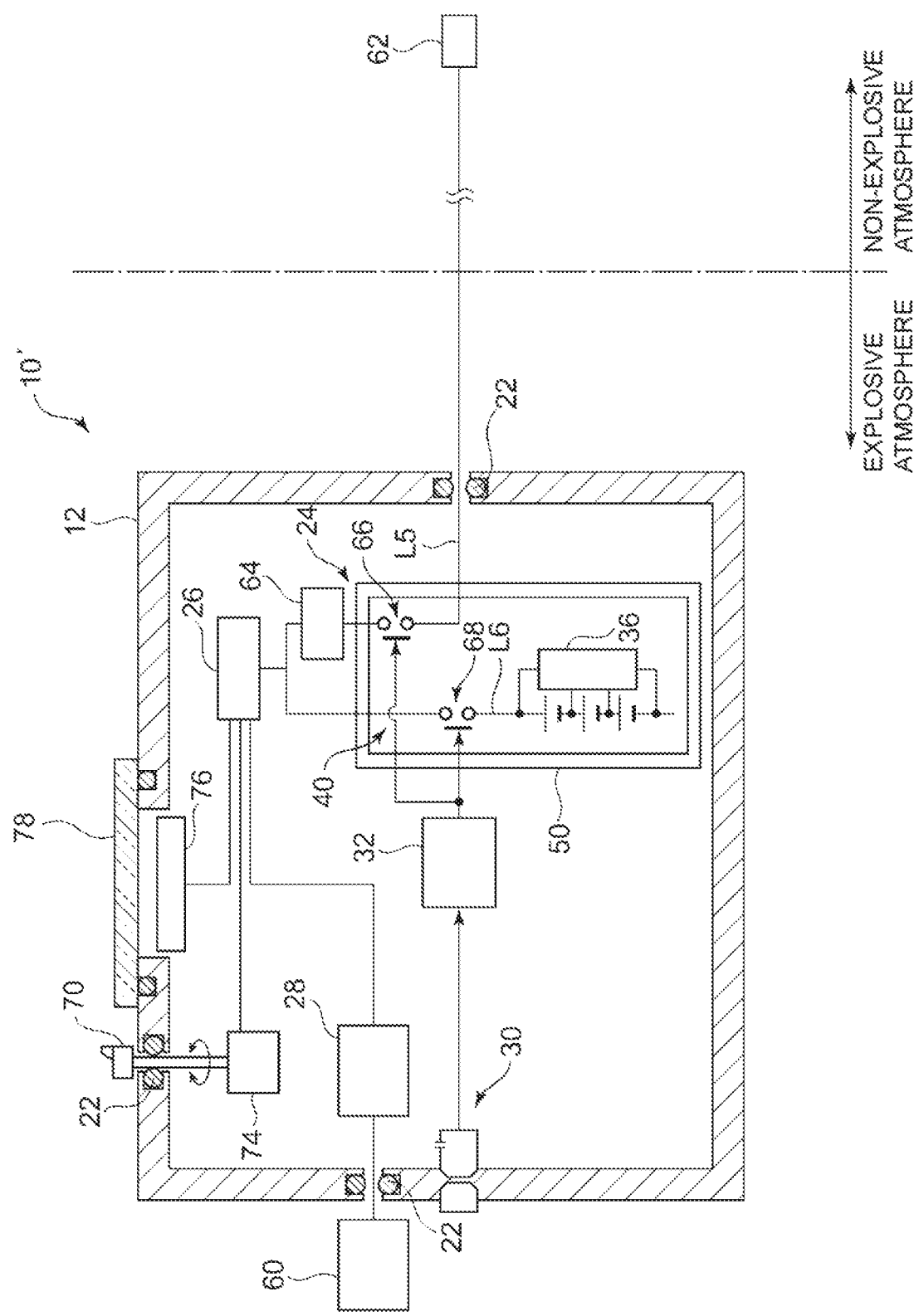
FIG. 3 is a schematic configuration diagram of an explosion-proof device according to another embodiment of the present invention.

Next, with reference to FIG. 3, another embodiment will be described. FIG. 3 is a schematic configuration diagram of an explosion-proof device 10' according to another embodiment. In FIG. 3, the same constituent elements as those in FIGS. 1 and 2 are associated with the same reference numerals, and not described again unless necessary.

The explosion-proof device 10' is a control panel provided fixed in an explosion-proof atmosphere, for controlling a pressure-resistant explosion-proof motor 60 to be controlled, disposed in an explosive atmosphere. Accordingly, the explosion-proof device 10' is different from the above described explosion-proof device 10 in that the explosion-proof device 10' is a non-traveling body fixed on a field.

The explosion-proof device 10' has an external power source (e.g. commercial AC source) 62 disposed in a non-explosive atmosphere as a normal power source. The external power source 62 supplies electric power to the electrical components housed in the frame 12 via a normal power line L5. The normal power line L5 is connected to an AC/DC converter 64 which is one of the electrical components housed in the frame 12, and the AC/DC converter is configured to convert AC power supplied from the external power source 62 to DC power. The DC power converted by the AC/DC converter 64 is supplied to the controller 26 serving as a control unit for the explosion-proof device 10'.

Herein, the explosion-proof device 10' includes a battery 24 housed in the frame 12, as an emergency power source. The battery 24 stores DC power in advance, and is connected to the controller 26 via an emergency power line L6. Switching relays 66, 68 are disposed in the normal power line L5 and the emergency power line L6, respectively. The switching relay 66 of the normal power line L5 is initially set in a closed state, and the switching relay 68 of the emergency power line L6 is set in a normal-open state. Accordingly, the controller 26 is normally supplied with power from the external power source 64.

While the external power source 62 is used as a normal power source and the battery 24 is used as an emergency power source in the present embodiment, the battery 24 may be used as a normal power source and the external power source 62 as an emergency power source. Alternatively, a third power source may be provided as a normal or emergency power source.

On the other hand, when an abnormality occurs (e.g. the external power source 62 falls into a shutdown state), the controller 26 switches the switching relay 66 of the normal power line L5 to an open state and the switching relay 68 of the emergency power line L6 to a closed state, thereby switching the power supply source for the controller 26 to the battery 24 from the external power source 62. Accordingly, even if an abnormality occurs in the external power source 62, it is possible to continue operation of the explosion-proof device 10' by using the battery 24 housed inside the frame 12 as an emergency power source.

Furthermore, an operation part 70 that an operator can operate is disposed outside the frame 12, and the content of operation of the operation part 70 is converted into electric signals by a switch 74 inside the frame 12, before being sent to the controller 26. The controller 26 receives the electric signals sent from the switch 74 to determine the operation capability of the operator, and sends control signals based on the content to a driver 28. The driver controls driving current of the pressure-resistant explosion-proof motor 60 to be controlled on the basis of the control signals obtained from the controller 26.

The explosion-proof device 10' is provided with a display 76 for displaying the content of operation by the operator and the content of control by the controller 26. The display 76 is configured to be visible to the operator outside the frame 12, via a tempered glass 78 disposed on the window section of the frame 12.

Similarly to the embodiment of FIG. 1, the frame 12 is filled with inert gas, thus being configured as an internal-pressure explosion-proof container capable of preventing an explosive gas from entering the frame 12. The internal pressure, or the differential pressure between the inside and the outside of the frame 12 is detected by the pressure detection part 30, and if it is determined on the basis of the detection result that there is a risk of an explosive gas entering the frame 12, the explosion-proof logic circuit 32 switches the switching relay 68 of the emergency power line L6 to an open state, thereby blocking power supply from the battery 24. Accordingly, even if an explosive gas flows into the frame 12, it is possible to effectively prevent an electrical component supplied with electric power from the battery 24 from becoming a source of ignition.

The battery 24 disposed inside the frame 12 is further housed in an explosion-proof container 50. In the present embodiment, in particular, the explosion-proof container 50 is configured as a pressure-resistant explosion-proof container having a pressure-resistant explosion-proof structure. However, similarly to FIG. 1, another suitable type of explosion-proof container can be employed corresponding to the specification of the battery such as the capacity. Accordingly, the battery 24 disposed inside the frame 12 for supplying electric power to the electrical components is housed in the explosion-proof container 50, and thereby it is possible to effectively suppress effects on the surroundings with the explosion-proof container 50, even in case of occurrence of explosion due to the battery 24 behaving as the source of ignition in case an explosive gas enters the frame 12.

Furthermore, the explosion-proof container 50 houses the switching relays 66, 68 respectively disposed in the normal power line L5 and the emergency power line L6, along with the battery 24. The switching relays 66, 68 may be a source of ignition for an explosive gas when being switched. Thus, with the switching relays 66, 68, which may be a source of ignition, housed inside the explosion-proof container 50 as described above, it is possible to effectively suppress effects on the surroundings even if the switching relays 66, 68 ignite an explosive atmosphere in the frame 12 to cause explosion.

In the present embodiment, the explosion-proof container 50 houses the management device 36 along with the battery 24, similarly to FIG. 2.

Accordingly, also in the explosion-proof device 10' fixed in an explosive atmosphere, the battery 24 disposed inside the frame 12 for supplying electric power to the electrical components is housed in the explosion-proof container 50, and thereby it is possible to effectively suppress effects on the surroundings with the explosion-proof container 50, even in case of occurrence of explosion due to the battery 24 behaving as the source of ignition in case an explosive gas enters the frame 12.

As described above, according to at least one embodiment of the present invention, it is possible to provide the explosion-proof device 10 having an explosion-proof structure capable of effectively suppressing damage to the surroundings due to explosion of the battery 24, in case an explosive atmosphere enters the frame 12.

INDUSTRIAL APPLICABILITY

The present disclosure can be applied to an explosion-proof device to be used in an explosive atmosphere.

DESCRIPTION OF REFERENCE NUMERALS

10 Explosion-proof device
12 Frame
16 Wheel
18 Motor
20 Reducer
20 Seal member
24 Battery
30 Pressure detection part
32 Explosion-proof logic circuit
34, 46 Receiver-transmitter
35, 43 Antenna
36 Management device
38 Switching relay
40 Protection device
50 Explosion-proof container
60 Pressure resistant explosion-proof container
62 External power source
64 AC/DC converter
66, 68 Switching relay
70 Operation part
74 Switch
76 Display
78 Tempered glass

The invention claimed is:

1. An explosion-proof device, comprising:
a frame having a hollow shape;
an electrical component disposed in the frame;
a battery being disposed inside the frame and being capable of supplying the electrical component with electric power;
a protection device configured to stop electric supply to the electrical component from the battery, if a pressure inside the frame becomes not greater than a predetermined pressure value or if a pressure differential between inside and outside of the frame becomes not greater than a predetermined pressure differential value;
an explosion-proof container housing the battery, inside the frame; and
a management device configured to manage the battery,
wherein the management device has a power supply route which is provided independently from a power line of the electrical component,
wherein the explosion-proof container houses the management device with the battery without a partition wall separating the management device and the battery.

2. The explosion-proof device according to claim 1,
wherein the protection device includes a switching relay disposed in a power line between the battery and the electrical component, and configured to be capable of blocking electricity to the electrical component from the battery, and
wherein the explosion-proof container houses the switching relay, along with the battery.

3. The explosion-proof device according to claim 1,
wherein the battery includes a plurality of battery cells connected in series with one another.

4. The explosion-proof device according to claim 1,
wherein the explosion-proof container comprises a pressure-resistant explosion-proof container.

5. The explosion-proof device according to claim 1,
wherein the frame comprises an internal-pressure explosion-proof container.

6. The explosion-proof device according to claim 1,
wherein the explosion-proof container comprises a safety-enhanced explosion-proof container.

7. The explosion-proof device according to claim 1, comprising a traveling body including a motor mounted thereto as a power source for traveling, the motor being capable of being driven by electric power supplied from the battery.

8. The explosion-proof device according claim 1, comprising a control panel powered by the battery serving as a normal or emergency power source.

* * * * *